(12) United States Patent
Funk

(10) Patent No.: US 6,169,884 B1
(45) Date of Patent: Jan. 2, 2001

(54) METHOD AND APPARATUS FOR REDUCING POWER IN RADIO TRANSMITTERS

(75) Inventor: Gregory John Funk, Delta (CA)

(73) Assignee: Sierra Wireless, Inc., Richmond (CA)

( * ) Notice: Under 35 U.S.C. 154(b), the term of this patent shall be extended for 0 days.

(21) Appl. No.: 09/056,895

(22) Filed: Apr. 6, 1998

(51) Int. Cl.⁷ .................................................. H04B 17/00
(52) U.S. Cl. .......................................... 455/67.1; 455/115
(58) Field of Search .................................... 455/67.1, 115, 455/117, 127, 558

(56) References Cited

U.S. PATENT DOCUMENTS

| 5,519,886 | 5/1996 | Gilbert et al. . |
| 5,603,101 | 2/1997 | Choi . |
| 5,774,784 | 6/1998 | Ohno . |

FOREIGN PATENT DOCUMENTS

| WO94/29968 | 12/1994 | (WO) . |
| WO96/33555 | 10/1996 | (WO) . |

OTHER PUBLICATIONS

European Patent Office, Patent Abstracts of Japan, Publication No. 09300866, Oki Electric Ind Co Ltd, Published Nov. 25, 1997.

Primary Examiner—Nguyen Vo
Assistant Examiner—Marsha D. Banks-Harold
(74) Attorney, Agent, or Firm—Burns Doane Swecker & Mathis L.L.P.

(57) ABSTRACT

A mechanism is provided for substantially reducing heat buildup within a mobile radio device having a radio transmitter. The invention is particularly applicable to PC Card wireless modems. In accordance with one aspect of the invention, device temperature in a mobile radio device is controlled by monitoring the temperature of the mobile radio device; if the temperature of the mobile radio device exceeds a threshold then, when the mobile radio device is to transmit information, transmission power of the mobile radio device is reduced, thereby reducing the amount of heat generated within the mobile radio device and allowing the temperature of the mobile radio device to decrease. Transmission power is reduced sufficiently to allow the temperature of the mobile radio to decrease but not so much as to affect the reliability of transmission in the typical case. Transmission power may also be reduced by, instead of reducing the power level, inserting brief pauses at intervals during the transmission, the transmit amplifier being turned off during such pauses and, in particular, inserting brief pauses into the inaudible SAT signal when a host computer coupled to the mobile radio device is receiving data from the mobile radio device. The pauses are made sufficiently short in duration that the radio connection is not lost.

13 Claims, 2 Drawing Sheets

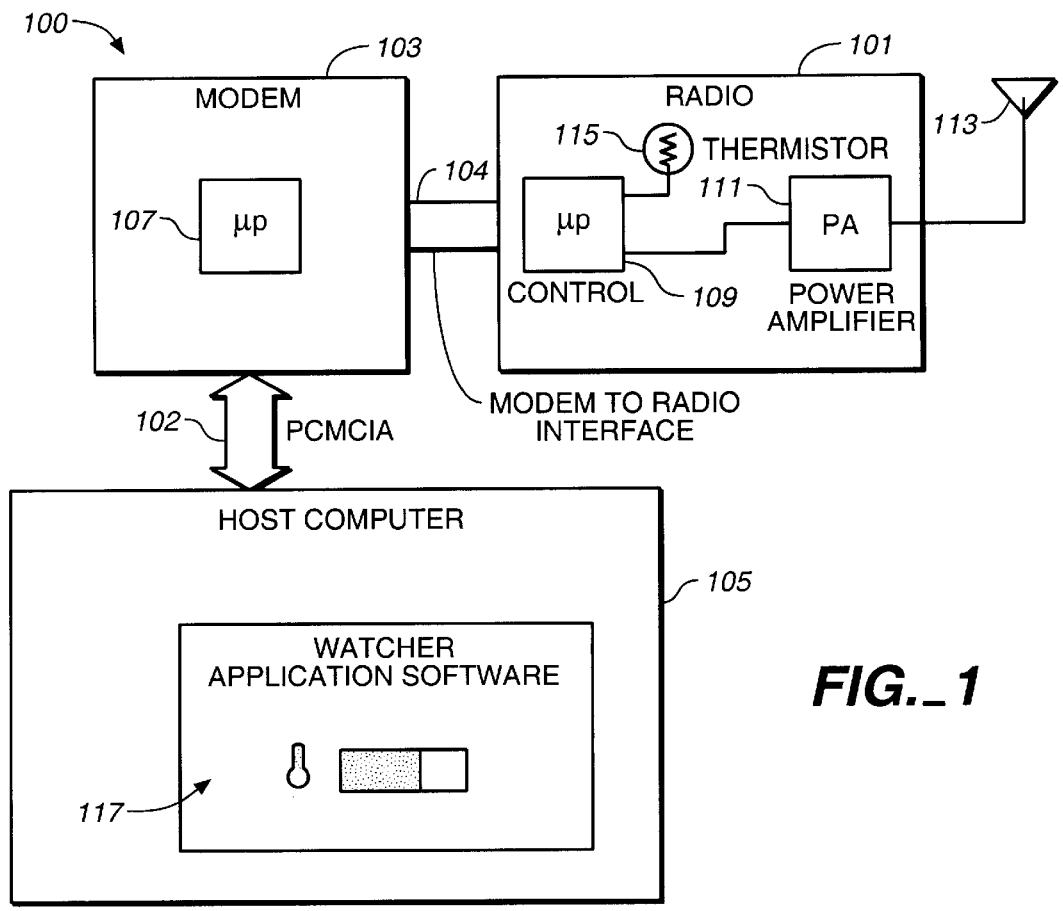
FIG._1
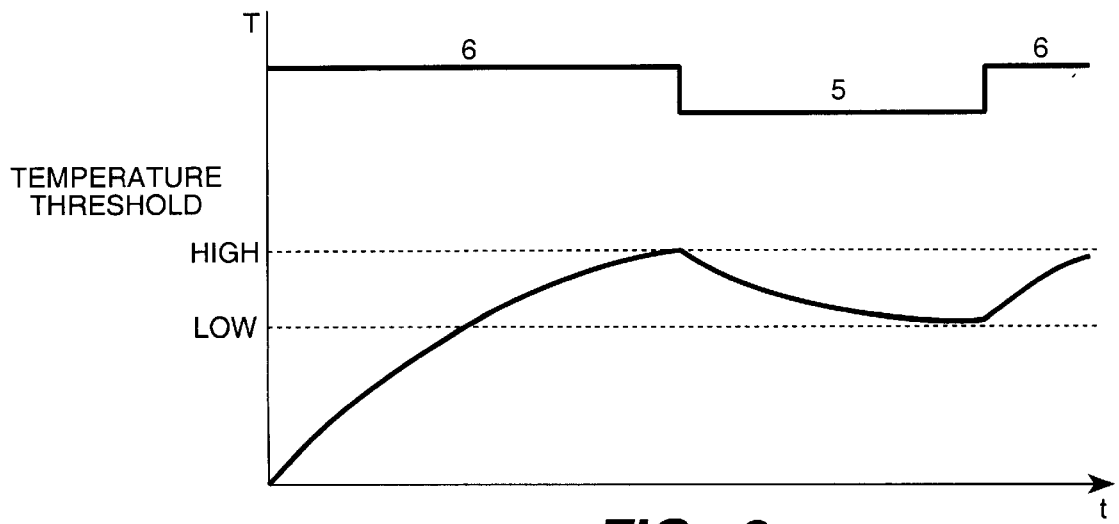
FIG._2

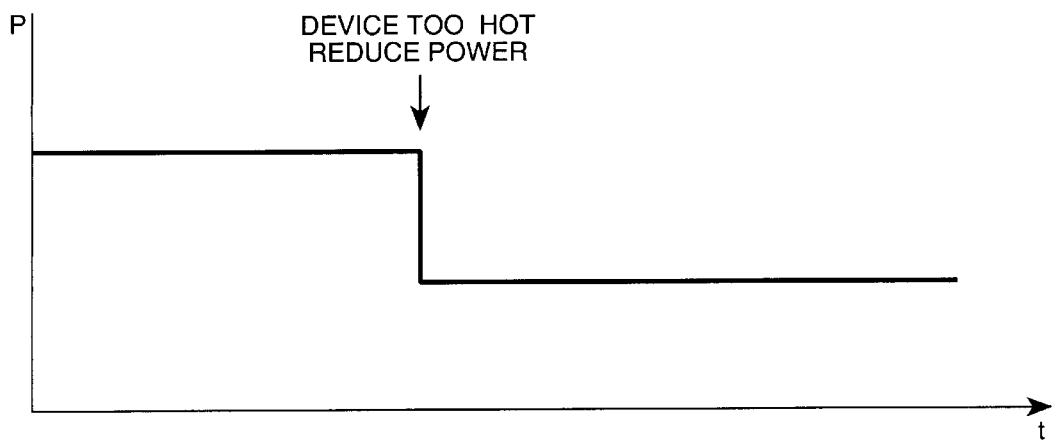
FIG._3
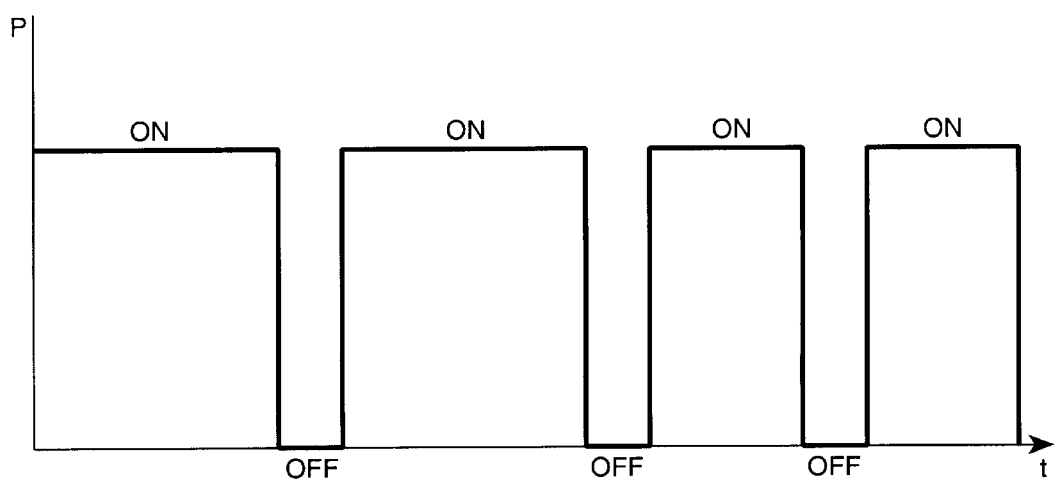
FIG._4

METHOD AND APPARATUS FOR REDUCING POWER IN RADIO TRANSMITTERS

BACKGROUND OF THE INVENTION

1. Field of the Invention

The present invention relates to the prevention of heat buildup in radio transmitters.

2. State of the Art

Wireless data and voice connectivity is increasingly in demand. Wireless data connectivity is typically achieved using a wireless modem/radio combination. This combination is often referred to generically as a wireless modem.

Wireless modems exist for various radio transmission standards. One such standard is the CDPD, or Cellular Digital Packet Data, standard. The CDPD service is implemented as an overlay on top of the AMPS, or Advanced Mobile Phone System, standard for cellular telephone communications. Within AMPS, a cellular telephone is instructed to transmit at one of several different power levels depending on the distance of the cellular telephone from a supervising radio base station. Similarly, the radio of a CDPD wireless modem is instructed to transmit at one of several different power levels. Nominal power levels within the AMPS/CDPD system are shown in Table I.

TABLE 1

Mobile Station Nominal Power Levels

| Mobile Station Power Level (PL) | Mobile Attenuation Code (MAC) | Nominal ERP dBW* Mobile Station Power Class | | |
|---|---|---|---|---|
| | | I | II | III |
| 0 | 000 | 6 | 2 | −2 |
| 1 | 001 | 2 | 2 | −2 |
| 2 | 010 | −2 | −2 | −2 |
| 3 | 011 | −6 | −6 | −6 |
| 4 | 100 | −10 | −10 | −10 |
| 5 | 101 | −14 | −14 | −14 |
| 6 | 110 | −18 | −18 | −18 |
| 7 | 111 | −22 | −22 | −22 |

*Nominal ERP values in watts for power level 0 are:
I. +6 dBW = 4.0 W
II. +2 dBW = 1.6 W
III. −2 dBW = 0.6 W Currently, a popular form factor for wireless modems is that of the PC Card, formerly referred to as the PCMCIA card. During use, a PC Card is inserted into a PC Card slot in a computer, such as a laptop or notebook computer. It is common for a PC Card wireless modem to have a portion that extends outside the PC Card slot. It is desirable, however, for a PC Card wireless modem to fit entirely within a PC Card slot. When such a PC Card is inserted into the PC Card slot, the surface area of the PC Card, with the exception of a small end surface, is entirely enclosed by the PC Card slot, greatly restricting air circulation.

Because the first PCMCIA cards were typically memory cards and other relatively low-power devices, the PCMCIA standard gave little or no consideration to heat dissipation. Similarly, the current PC Card standard does not address issues of heat dissipation. Consequently, for a PC Card wireless modem of the type described, if prolonged transmission at high power levels is performed, heat buildup may occur. Such heat buildup is disadvantageous in several respects. Heat buildup may reduce the expected useful life of the wireless modem. Furthermore, heat may build up to such an extent that, when the user withdraws the wireless modem from the PC Card slot, the wireless modem is hot to the touch. In extreme cases, the modem may be sufficiently hot as to cause discomfort or even mild burns. In any event, such heat buildup will likely be the cause of consternation on the part of the user.

Therefore, there exists a need for a method and apparatus whereby heat buildup in a wireless modem or other device including a radio transmitter may be substantially reduced. The present invention addresses this need.

SUMMARY OF THE INVENTION

The present invention, generally speaking, provides a mechanism for substantially reducing heat buildup within a mobile radio device having a radio transmitter. The invention is particularly applicable to PC Card wireless modems. In accordance with one aspect of the invention, device temperature in a mobile radio device is controlled by monitoring the temperature of the mobile radio device; if the temperature of the mobile radio device exceeds a threshold then, when the mobile radio device is to transmit information, transmission power of the mobile radio device is reduced, thereby reducing the amount of heat generated within the mobile radio device and allowing the temperature of the mobile radio device to decrease. Transmission power is reduced sufficiently to allow the temperature of the mobile radio to decrease but not so much as to affect the reliability of transmission in the typical case. In this respect, the technique takes advantage of extra margin built into commonly-employed radio data transmissions standards such as the CDPD (Cellular Digital Packet Data) standard.

In accordance with another aspect of the invention, a mobile radio device includes a power amplifier, a temperature-variable component, and a microprocessor/microcontroller coupled to the power amplifier and the temperature-variable component. A memory coupled to the microprocessor/microcontroller contains instructions for monitoring device temperature and reducing transmission power when a temperature threshold is exceeded, in the same manner as described previously. The mobile radio device may advantageously be formed as a PC Card.

In accordance with another aspect of the present invention heat and power is reduced by inserting brief pauses at intervals during transmission by the mobile radio device effectively reducing the transmission duty cycle, the transmit amplifier being turned off during such pauses. The pauses are made sufficiently short in duration that the radio connection is not lost.

In another embodiment, the data transmission mode (i.e. receive mode or transmit mode) of the host processor coupled to the mobile radio device is monitored. In the case when the host processor is receiving data, brief pauses are inserted into the SAT signal being transmitted from the mobile radio device, where the transmit amplifier is turned off during such pauses and the pauses are made sufficiently short in duration that the radio connection is not lost. In one embodiment, the data transmission mode is monitored by a microprocessor within a modem coupled between the mobile radio device and the host processor.

BRIEF DESCRIPTION OF THE DRAWING

The present invention may be further understood from the foregoing description in conjunction with the appended drawing. In the drawing:

FIG. 1 is a block diagram of a computer system including a mobile radio device;

FIG. 2 is a timing diagram showing both temperature and the power level of radio transmissions as functions of time;

FIG. 3 is a timing diagram illustrating the reduction of transmission power by lowering the transmit power level; and FIG. 4 is a timing diagram illustrating the reduction of transmission power by inserting brief pauses at intervals during the transmission, the transmit amplifier being turned off during such pauses.

DETAILED DESCRIPTION OF THE PREFERRED EMBODIMENTS

Referring now to FIG. 1, a block diagram is shown of a computer system 100 in which the present invention may be used. A mobile radio device 101 is coupled to a modem 103. The modem 103 is coupled in turn to a host computer 105. In an exemplary embodiment, both the mobile radio device 101 and the modem 103 may be realized in the form of PC Cards as described in greater detail in U.S. patent application Ser. No. 08/724,459 entitled TWO-PIECE PCMCIA MULTI-MODE WIRELESS MODEM, filed on Oct. 1, 1996 and incorporated herein by reference.

The modem 103 interfaces to the host computer 105 through a standard PCMCIA or PC Card interface 102. Operations of the modem 103 are controlled by a microprocessor or microcontroller 107 within the modem 103. The modem 103 interfaces to the radio 101 through a general-purpose interface 104.

Operations of the radio 101 are controlled by a microprocessor or microcontroller 109 within the radio 101. The microprocessor/microcontroller 109 issues control signals to a power amplifier 111 within the radio 101 including a control signal to "key" the radio (turn the power amplifier on) or "dekey" the radio (turn the power amplifier off) and a control signal that determines the power resulting level (i.e., how hard the power amplifier is driven). The power amplifier 111 is coupled to an antenna 113 that radiates an amplified transmission signal.

A thermistor 115 or other suitable temperature-sensitive component is mounted within the radio 105 and is coupled to the microprocessor/microcontroller 109. At intervals, the microprocessor/microcontroller 109 samples a signal produced by the thermistor 115 and converts the signal to a digital quantity. This quantity is then transmitted through the modem 103 to the host computer 105, where it is displayed graphically on a display screen of the host computer 105. If the temperature of the radio 105 exceeds a temperature at which the radio 105 may be comfortably handled, the user may be apprised of this fact by means of the graphical display 117.

The digitized temperature reading is also used to control transmission power in such a way as to provide an opportunity for the temperature, if it is elevated, to decrease. A control strategy is implemented according to two temperature thresholds, a high temperature threshold and a low temperature threshold. Referring to FIG. 2, assume that initially a mobile radio device is transmitting at a high power level, for example level 6 in Table I. Assuming the mobile radio device is realized as a PC Card having limited heat-sinking capabilities, as transmission continues, the temperature of the mobile radio device will steadily rise. When the temperature reaches the high threshold (as determined by the microprocessor/microcontroller 109 sensing the signal from the thermistor 115), the microprocessor/microcontroller 109 issues a control signal to the power amplifier 111 to cause it to "back off" to a lower power level.

In the example illustrated in FIG. 2, the power amplifier 111 is caused to reduce transmission power from level 6 to level 5. This reduction in power may reduce heat dissipation by half or more. Consequently, the temperature will begin to decrease. Furthermore, experimental results indicate that in the typical case, slight degradation in performance is experienced as a result of the decreased power transmission. The often negligible impact on performance may be attributed to generous margins having been built into the power level structure of Table I.

Referring still to FIG. 2, as temperature continues to decrease, the reduced power level is maintained until temperature has decreased to the low threshold value. At that time, the power level may be increased back to the original level, e.g., level 6. The high and low power levels therefore define a hysteresis band within which temperature may gradually swing from one threshold to the other. Of course, at lower power levels (used in closer relative proximity to a radio base station) the temperature may not enter the hysteresis band at all or, having entered the hysteresis band, may decrease below the low threshold.

In the example of FIG. 2, transmission power is reduced by reducing the power level. This manner of operation is shown more clearly in FIG. 3. In FIG. 3, transmission power is maintained at a high level until the microprocessor/microcontroller 109 senses that the device is too hot (i.e., the temperature has reached the high threshold). At that time, transmission power is reduced by reducing the power level.

Transmission power may be reduced in ways other than reducing the power level. Referring to FIG. 4, for example, transmission power may be reduced by, instead of reducing the power level, inserting brief pauses at intervals during the transmission, the transmit amplifier being turned off during such pauses. The pauses are made sufficiently short in duration that the radio connection is not lost. In AMPS cellular systems, an inaudible SAT (Supervisory Audio Tone) is continuously transmitted during a connection. If the SAT goes undetected for more than a predetermined period of time, the connection is dropped. The pauses in FIG. 4 are therefore calculated to be shorter in duration than the aforementioned SAT time-out period.

One method of reducing power by inserting brief pauses during transmission is to monitor whether the host computer is transmitting or receiving data and when the host computer is in a receive mode, insert pauses into the continuously transmitted SAT signal to reduce power. In particular, in the system shown in FIG. 1, the host computer typically receives more data than it transmits. For instance, the host computer may be linked to an Internet connection such that large amounts of data received by the receiver portion of radio 101 (not shown) is down loaded to the host computer 105. During this time period, radio 101 continuously transmits a SAT signal to maintain the wireless connection. In this case, one manner in which power is reduced is to employ microprocessor 107 to detect when the host 105 is in a receive mode and to insert pauses into the SAT signal as described above by causing the power amplifier (PA 111) to be turned off intermittently by microprocessor 109 in response to control transmitted from microprocessor 107.

It will be appreciated by those of ordinary skill in the art that the present invention can be embodied in other specific forms without departing from the spirit or essential character thereof. The present description is therefore considered in all respects to be illustrative and not restrictive. The scope of the invention is indicated by the appended claims rather than the foregoing description, and all changes which come within the meaning and range of equivalents therefore are intended to be embraced therein.

What is claimed is:

1. A method of controlling a device temperature in a mobile radio device, comprising the steps of:

monitoring temperature of the mobile radio device; and if the temperature of the mobile radio device exceeds a first threshold, when the mobile radio device is to transmit information, reducing the transmission power of the mobile radio device as a consequence of the temperature of the mobile radio device exceeding a threshold by detecting that a host computer is in a receive mode and reducing a transmission duty cycle of a SAT signal so as to transmit said SAT signal with intermittent interruptions, thereby reducing the amount of heat generated within the mobile radio device and allowing the temperature of the mobile radio device to decrease.

2. The method of claim 1, comprising the further step of, if at a later time the temperature of the mobile radio device does not exceed a second lower threshold when the mobile device is to transmit information, increasing transmission power of the mobile radio device.

3. The method of claim 1, wherein monitoring comprises sampling a signal produced by a temperature-variable component.

4. The method of claim 3, wherein monitoring further comprises communicating data indicative of a level of said signal to the host computer and displaying a graphical representation of the data on a screen of the host computer.

5. The method of claim 1, wherein reducing transmission power comprises reducing a transmit power level.

6. The method of claim 1, wherein reducing transmission power comprises reducing a transmission duty cycle so as to transmit with intermittent interruptions.

7. The method of claim 6, wherein the interruptions are of a sufficiently short duration as to not cause a radio connection to be lost.

8. The method of claim 1, wherein the interruptions are of a sufficiently short duration as to not cause a radio connection to be lost.

9. A mobile radio device comprising:

a power amplifier;

a temperature-sensitive component;

a microprocessor/microcontroller coupled to the power amplifier and the temperature-sensitive component; and a memory coupled to the microprocessor/microcontroller containing instructions for monitoring temperature of the mobile radio device; and if the temperature of the mobile radio device exceeds a first threshold, when the mobile radio device is to transmit information, reducing the transmission power of the mobile radio device as a consequence of the temperature of the mobile radio device exceeding a threshold by detecting that a host computer is in a receive mode and reducing a transmission duty cycle of a SAT signal so as to transmit said SAT signal with intermittent interruptions, whereby the amount of heat generated within the mobile radio device is reduced, allowing the temperature of the mobile radio device to decrease.

10. The apparatus of claim 9, wherein the mobile radio device is formed as a PC Card.

11. A system comprising:

a mobile radio device having a power amplifier, a microprocessor/microcontroller coupled to the power amplifier and wherein said mobile radio device transmits a SAT signal during a wireless transmission/reception connection;

a host computer having associated data modes including a first mode in which said host computer is receiving data from said mobile radio device and including a second mode in which said host computer is transmitting data through said mobile radio device;

a means for monitoring said data modes of said host computer and, if said data mode is in said first receive mode, said microprocessor/microcontroller mobile radio device causes said SAT signal to be intermittently interrupted while ensuring said wireless connection is maintained so as to reduce transmission power of said mobile radio device.

12. The system of claim 11, wherein the mobile radio device is formed as a PC Card.

13. The system of claim 11, wherein said means for monitoring resides in a modem coupled between said mobile radio device and said host computer.

* * * * *